United States Patent [19]

Stappaerts

[11] Patent Number: 5,378,888
[45] Date of Patent: Jan. 3, 1995

[54] HOLOGRAPHIC SYSTEM FOR INTERACTIVE TARGET ACQUISITION AND TRACKING

[75] Inventor: Eddy A. Stappaerts, Rancho Palos Verdes, Calif.

[73] Assignee: Northrop Grumman Corporation, Los Angeles, Calif.

[21] Appl. No.: 106,840

[22] Filed: Aug. 16, 1993

[51] Int. Cl.[6] ............................................. G01J 1/20
[52] U.S. Cl. .................................. 250/201.9; 356/121
[58] Field of Search ................... 250/201.9; 356/363, 356/121; 359/124, 183; 382/29, 31, 68

[56] References Cited

U.S. PATENT DOCUMENTS

| 4,326,800 | 4/1982 | Fitts | 356/152 |
|---|---|---|---|
| 4,376,950 | 3/1983 | Brown et al. | |
| 4,490,039 | 12/1984 | Bruckler et al. | 356/121 |
| 4,764,982 | 8/1988 | Pfund | |
| 4,943,709 | 7/1990 | Grinberg et al. | 250/201.9 |
| 4,963,725 | 10/1990 | Hong et al. | 250/201.9 |
| 4,987,607 | 1/1991 | Gilbreath et al. | |
| 5,021,643 | 6/1991 | Baciak | 250/201.9 |
| 5,046,824 | 9/1991 | Pepper | 359/72 |
| 5,048,935 | 9/1991 | Efron et al. | 359/36 |
| 5,083,015 | 1/1992 | Wittoft et al. | 250/201.9 |
| 5,102,214 | 4/1992 | Steele | 250/201.9 |

Primary Examiner—David C. Nelms
Assistant Examiner—K. Shami
Attorney, Agent, or Firm—Terry J. Anderson; Karl J. Hoch, Jr.

[57] ABSTRACT

A holographic laser target acquisition and tracking system with aberration compensation including a detector array, a master-oscillator (MO), a hologram processor, a spatial light modulator (SLM) and a slave oscillator which is referred to as a Holographic Interactive Tracker system. The operation of the system consists of two steps. In step one, an acquisition step, a diverging laser beam (acquisition beam) from the laser oscillator is transmitted to a target 38. The beam divergence is typically much larger than the target angular extent. A fraction of the diverging energy intercepted by the target is returned, as a beam or as diffuse radiation, and collected by a receiver optic. This target return is interfered with a master oscillator beam from the MO on the electronic detector array, thereby forming an electro-optic hologram. The detector array is read out pixel by pixel and applied to the hologram processor which enhances the hologram by subtracting out the d.c. component. The hologram is processed, and the resulting pattern is transferred pixel by pixel to the spatial light modulator (SLM) where the electronic hologram is written in as a phase hologram. In step two, an engagement step, a beam from the same or a separate laser oscillator is reflected off the SLM. The SLM output consists of multiple beams (orders) of radiation, one of which is the conjugate of the target return radiation. Through the properties of phase conjugation, this beam retraces the target return path while, at the same time, the wavefront distortions are undone, resulting in maximum energy delivery to the target. By repeating acquisition and engagement steps one and two as the target moves, the system automatically tracks it.

21 Claims, 4 Drawing Sheets

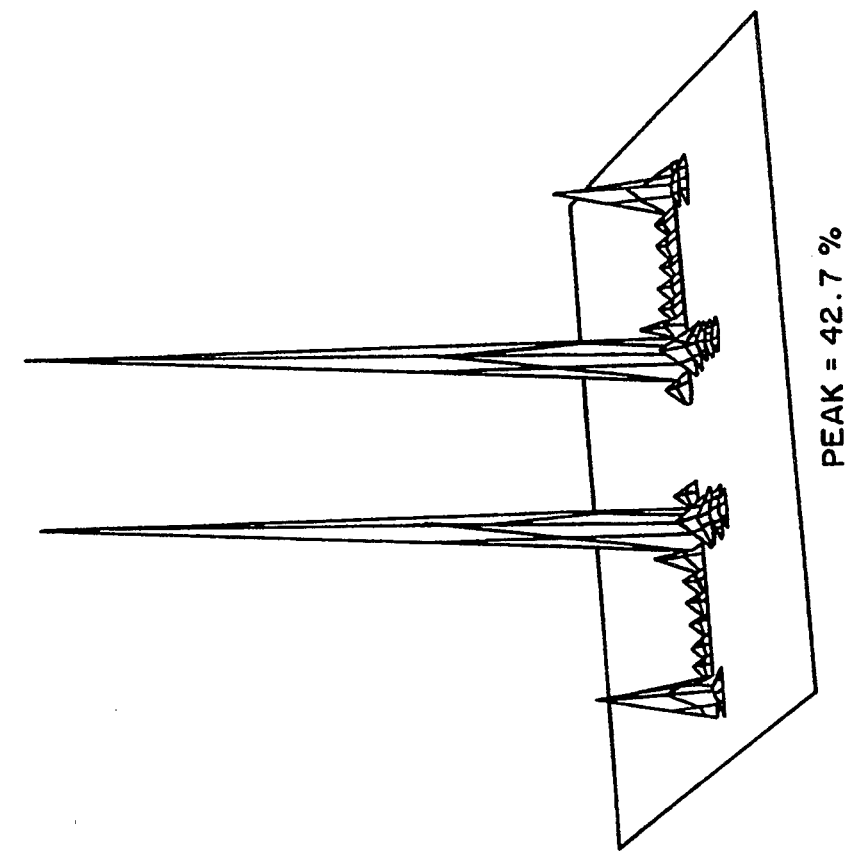
FIG. 6 BINARY
PEAK = 42.7 %
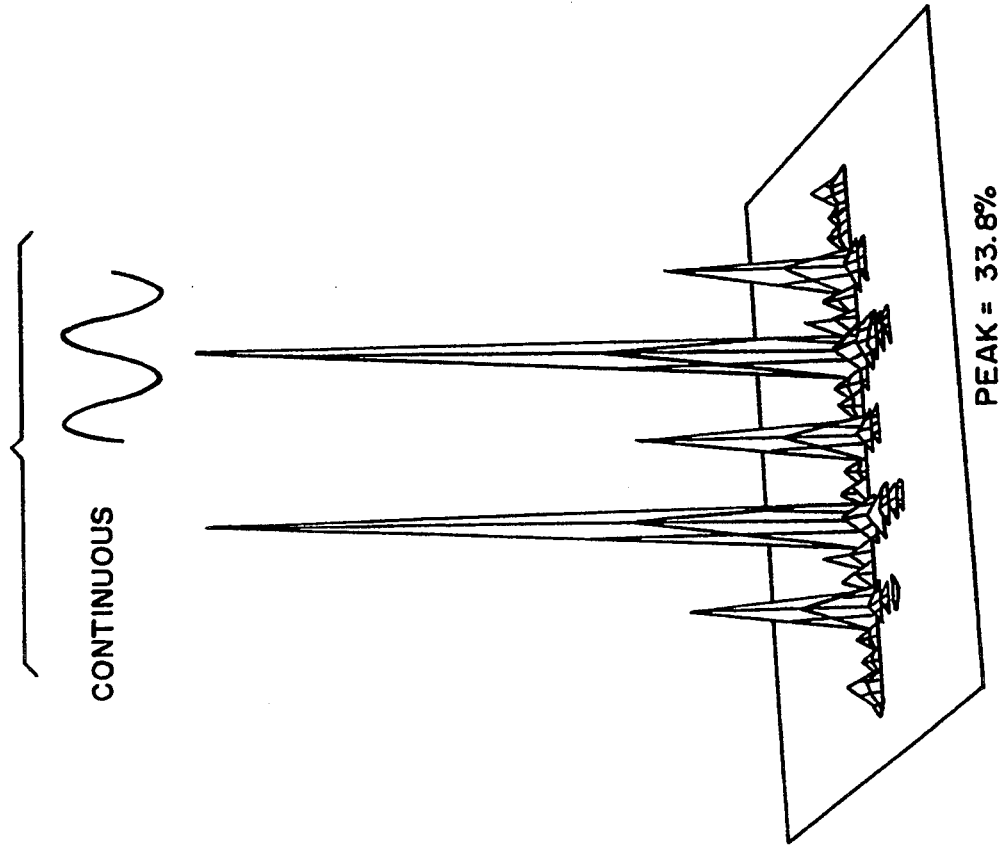
FIG. 5 CONTINUOUS
PEAK = 33.8%

HOLOGRAPHIC SYSTEM FOR INTERACTIVE TARGET ACQUISITION AND TRACKING

FIELD OF THE INVENTION

The present invention relates to laser target acquisition and tracking systems, and more particularly to a holographic system for target acquisition and tracking including atmospheric distortion compensation.

BACKGROUND OF THE INVENTION

In many laser uses and applications the laser beam energy must be transmitted through aberrating media such as the earth's atmosphere. The aberrations result in decreased energy delivery to a target. Two techniques for distortion compensation, known as "conventional" and "unconventional" have been developed and are available in the art. "Conventional" adaptive optics schemes use wavefront sensors combined with deformable mirrors. "Unconventional" adaptive optics schemes are primarily based on all-optical phase conjugation using nonlinear optics devices. Both techniques are reviewed in "Principles of Adaptive Optics", by R. K. Ryson, Ch. 3 (Academic Press, 1991).

In a conventional adaptive optics system as illustrated in FIG. 1, energy from a laser 10 is transmitted through suitable optics 12, a sampler 14, such as a beam splitter, a wavefront corrector means 16 and onto a target 18 through aberrating media. The wavefront that returns from the target is directed by sampler 14 to wavefront sensor (WFS) means 20 and is measured and, from this measurement, an optimum profile for the corrector deformable mirror is computed by control means 22. The outgoing laser beam is reflected off the corrector, and maximum energy delivered to the target.

In an unconventional adaptive optics system as illustrated in FIG. 2, a nonlinear optics phase conjugator 24 provides a nonlinear optics process such as four-wave-mixing or stimulated Brillouin scattering that is used to generate the conjugate of the electric field received through aberratory media from a beacon source 27. The beacon can be a target glint. With a perfect conjugation system, the conjugated beam retraces the path of the beacon (time-reversal), resulting in maximum energy delivered to the target. For long propagation paths and/or weak beacons, very large optical amplifications, on the order to $10^{10}$–$10^{15}$, are required in the combination of the conjugator 24 and the amplifier 26.

SUMMARY OF THE INVENTION

An illustration of an embodiment of the present invention is shown in FIG. 3. In FIG. 3, the system components include a charge-coupled-device detector array (CCD) 28, a master-oscillator (MO) 30, a hologram processor 32, a spatial light modulator (SLM) 34 and a slave oscillator 36. The system of FIG. 3 will be referred to as a Holographic Interactive Tracker (HIT). The operation of the system consists of the following two steps.

In step one, the acquisition step as illustrated in FIG. 3, a diverging laser beam 37 (acquisition beam) from laser oscillator 36 is transmitted to a target 38. The beam divergence is typically much larger than the target angular extent, and the target direction therefore must not be known precisely, but only be contained within the beam divergence angle. A fraction of the diverging energy intercepted by the target 38 is returned, as a beam or as diffuse radiation, and collected by a receiver optic 40. This target return is interfered with a master oscillator beam from MO 30 on CCD electronic detector array 28, thereby forming an electro-optic hologram. The detector array is read out pixel by pixel and applied to hologram processor 32 which enhances the hologram by subtracting out the d.c. component. The hologram is processed, and the resulting pattern is transferred pixel by pixel to spatial light modulator (SLM) 34 where the electronic hologram is written in as a phase hologram.

In step two, the engagement step as illustrated in FIG. 4, a beam from the same or a separate laser oscillator 36 is reflected off the SLM 34. The SLM 36 output consists of multiple beams (orders) of radiation. For the optimum case where the SLM 36 is a phase-modulator array, thirty to forty percent of the energy is contained in a beam (order) which is the conjugate of the target return radiation. Through the properties of phase conjugation, this beam retraces the target return path while, at the same time, the wavefront distortions are undone, resulting in maximum energy delivery to the target. By repeating acquisition and engagement steps one and two (FIGS. 3 and 4) as the target moves, the HIT system automatically tracks it.

The present invention provides automatic target acquisition and tracking, as well as aberration compensation. In contrast to conventional adaptive optics techniques, no wavefront reconstruction algorithms are required. In contrast to unconventional all-optical phase conjugation schemes, no optical amplification of the target return is required, and the energy of the outgoing laser beam is limited only by the energy of the readout laser and the SLM optical damage limit.

If the target illuminated in step one of FIG. 3 has a feature which provides a stronger return than other illuminated parts, the HIT system will automatically lock onto it and track it.

The HIT system can also form the basis of secure one or two-way communication systems between stationary or moving platforms. After an acquisition step using one or two large-divergence beams, secure communications can be carried out over one or two low-divergence beams. The secure communication link can also be used for vehicle guidance, transmitting guidance commands along the narrow beam to the moving vehicle.

An object of the present invention, therefore, is to provide a target acquisition and tracking system having excellent sensitivity due to homodyne detection, thereby allowing large target ranges and/or low acquisition laser energy.

Another object of the present invention is to provide an atmospheric distortion compensation system resulting in maximum laser energy delivery to a target.

Another object of the present invention is to provide a target acquisition and tracking system with very short system latency time, through the use of parallel electronics, thereby providing quasi-real-time operation compatible with dynamic engagements and rapidly-varying aberrators.

Still another object of the present invention is to provide a target acquisition tracking system for UV, visible and IR radiation, requiring only an appropriate detector array and SLM.

A still further object of the present invention is to provide a target acquisition and tracking system having capability for multiple target engagement by processing of the electronic hologram, as well as capability for precision pointing, focusing, defocusing, and other beam control operations.

BRIEF DESCRIPTION OF THE DRAWINGS

FIG. 5 is an illustration of a far field pattern for an analog (continuous) hologram.

FIG. 6 is an illustration of a far field pattern for a binary hologram.

DETAILED DESCRIPTION OF THE PREFERRED EMBODIMENTS

Figure 1:
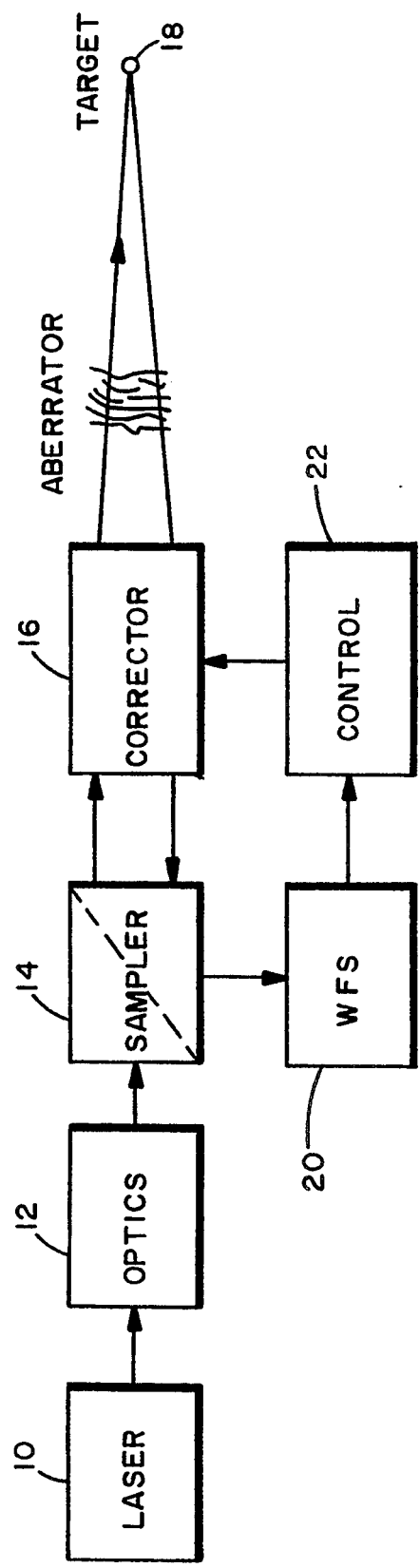
FIG. 1 is a schematic illustration of one embodiment of a system for distortion compensation known in the prior art as a conventional adaptive optics system.
Figure 2:
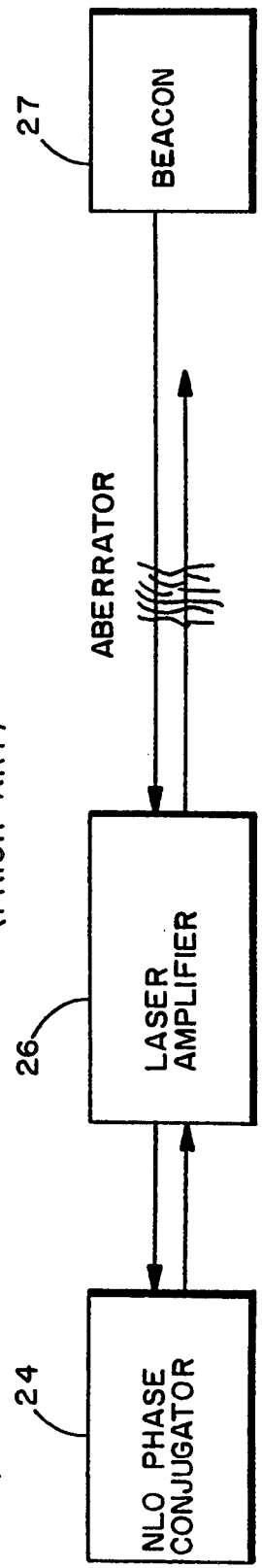
FIG. 2 is a schematic illustration of another embodiment of a system for distortion compensation known in the prior art as an unconventional adaptive optics system.
Figure 3:
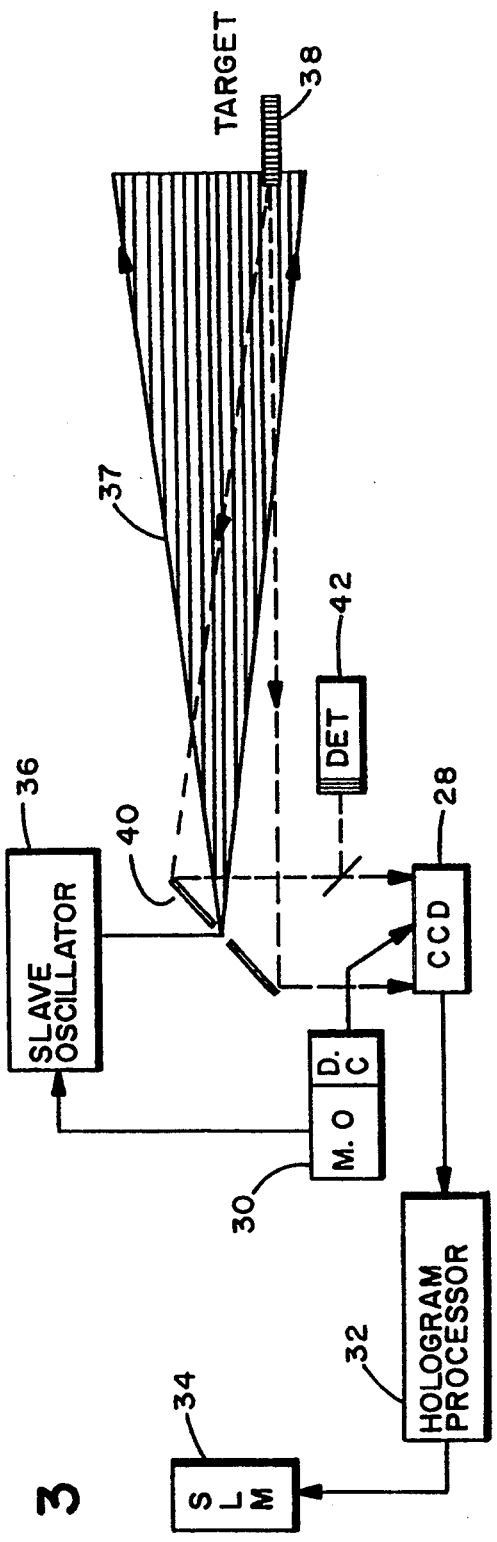
FIG. 3 is an illustration of an embodiment of a target acquisition and tracking system according to the principles of the present invention that shows an acquisition step.

FIG. 3 illustrates an embodiment of a system according to the invention and the operation of the acquisition step of the invention. During the acquisition step, a pulsed laser oscillator 36 frequency-locked to a master oscillator (MO) 30, illuminates the target 38 with a beam 37. Ideally, the divergence of beam 37 matches or exceeds the uncertainty of the target direction to avoid the need for scanning the beam. The target return is collected by a receiver optic 40 and interfered with a frequency-shifted master oscillator beam on a CCD electronic detector array 28, thereby creating an electronic hologram. The target return and the frequency-shifted MO beam correspond to the object and reference beams used in ordinary holography. The type of detector 28 employed must be matched to the laser wavelength. For example, silicon is suitable for visible and near-IR wavelengths, while InSb and HgCdTe can be used with mid-IR wavelengths.

The receiver acceptance angle, $Th_{rec}$, is approximately given by:

$$TH_{rec} = N \times 1b/D \tag{1}$$

where N is the number of pixels in a row/column of the detector array, $1b$ the laser wavelength, and D the receiver/engagement transmitter optic size. In the following discussion, the electronic detector array 28 will be referred to as CCD, since charge-coupled devices are most appropriate. A square geometry with equal numbers of rows and columns N×N) will be assumed. By example, for a wavelength of 4 μm, N = 128, and D = 5 cm, $Th_{rec}$ = 10 milliradians. At a target range of 4 km, this provides a spot size of 40 m, much larger than a typical target size.

The reference beam from MO 30 must illuminate the CCD detector 28 only during a time interval centered around the arrival time of the target return. The duration of this "pulse" must be kept sufficiently short to avoid saturating the "buckets" of the CCD detector 28. If the target range is initially unknown to the required precision, it can be obtained for example by measuring the target roundtrip time using a time-resolving detector 42 such as illustrated in FIG. 3.

The frequency of the reference beam from MO 30 must match the frequency of the target return radiation, i.e.

$$D_o \times T_p < 1 \tag{2}$$

where $T_p$ is the illuminator laser pulse length and $D_o$ the frequency difference between the reference beam and the target return radiation. In the case of a large line-of-sight velocity component between the transmitting means and the target 38, the target return frequency will differ from the laser oscillator 36 acquisition frequency (which is slaved to the master oscillator 30 (MO) frequency) by a Doppler shift. The reference beam frequency must be offset from the MO frequency by this Doppler-shift in order to obtain a hologram (the frequency-shifted MO corresponds to the local oscillator used in conventional radar systems). A Doppler-shift compensator is indicated by "DC" in FIGS. 3, 4 and 7. The Doppler shift may be determined from a series of target roundtrip time measurements and/or a separate heterodyne detector and/or a frequency search algorithm where the MO frequency is stepped in small increments, on the order of $1/T_p$, until a high quality hologram is obtained.

Both the acquisition laser pulse and the reference beam pulse must be nearly transform-limited (no intrapulse phase modulation) in order to obtain stationary holograms on the CCD.

Mathematically, the hologram pattern is described by:

$$H(i,j) = |R(i,j)|^2 + o(i,j)R(i,j)^* + o(i,j)^* R(i,j) + |o(i,j)|^2$$

where R(i,j) and o(i,j) are the complex electric fields of the reference beam and the object beam, for pixel (i,j). The reference beam intensity must be nearly uniform across the CCD. For optimum operation, the object intensity term (term 4 of expression (3)) must be small compared to the reference intensity term (term 1 of expression (3)). The reference intensity term (term 1), is a bias term which contains no information. The second and third term contain the information about the target and the intervening medium.

The homodyne gain is given by:

$$G_H = |R|^2 / |o_{rms}|^2 = n_R / n_{o,rms} \tag{4}$$

where $n_R$ is the number of photoelectrons/pixel due to the reference beam, and $n_{o,rms}$ is the rms number of photoelectrons/pixel due to the target return. This electronic gain is the equivalent of the optical amplifier gain of all-optical, unconventional adaptive optics systems, but its magnitude can be much lower since it must only be sufficient to provide adequate detection signal-to-noise ratio (SNR).

The homodyne detection signal-to-noise ratio is given by:

$$SNR = 2n_R n_{o,rms}/(n_{o,rms} + n_R + n_B + n_j^2) \tag{5}$$

where $n_B$ is the number of photoelectrons due to the background (collected during the time between CCD-clear and CCD-readout), and $n_j^2$ is the thermal (Johnson) noise due to the CCD detector 28 and associated preamplifiers. The number of reference beam photoelectrons can usually be made to dominate the background and Johnson noise, in which case equation (5) simplifies to:

$$SNR \sim 2n_{o,rms} \quad (6)$$

According to expression (6), single-pixel unity SNRs can be obtained with a number of target return photoelectrons/pixel on the order of unity. Computer simulations and experiments of the invention have shown that, because of the large number of CCD detector 28 pixels, operation with even considerably weaker target returns is possible.

After the hologram has been recorded on the CCD detector 28, the CCD detector 28 is read-out and the hologram pattern processed in an electronic hologram processor 32. The required processing is very simple, requiring only a subtraction of the d.c. bias term. For maximum speed and minimum system latency time (time between CCD 28-write and SLM 34-read), the CCD electrical readout, hologram processing, and SLM electrical write can be carried out in parallel for all rows (or columns), in a pipelined fashion. This results in near real-time operation, with latency times as low as about five microseconds using state-of-the-art electronics.

The processed hologram pattern can be written to the SLM 34 as an amplitude or phase hologram. Amplitude holograms are less desirable because of their low diffraction efficiency (<10%) into the desired order. Analog phase holograms have higher maximum efficiencies of 34%. However, operation with even higher diffraction efficiency into the conjugate order is obtained by binarizing the processed hologram, and assigning pixel phases of 0 and pi/2 for reflection SLMs, or 0 and pi for transmission SLMs. With a binary phase hologram, no zero order is present in the SLM output, and the efficiency in the conjugate order is increased to approximately 40%.

FIGS. 5 and 6 show computed far field patterns for analog (continuous) and binary SLMs, for the case of a sinusoidal hologram (corresponding to a plane wave target return). Note the higher efficiency and absence of a zero order for the binary case. Analysis and computer simulations show that near-40% diffraction efficiencies are obtained not just for this simple hologram, but also for more complex holograms.

The SLM 34, when illuminated at the proper angle by a beam from the same or a separate laser 36, produces a reconstructed (target return) field and a conjugated (target return) field. Through the fundamental property of phase conjugation, the conjugated target return retraces the path of the original target return, which is representative of only the portion of the wide-divergence acquisition beam that was reflected from the target, and the wavefront distortions due to media aberrations are undone.

Using the two-step procedure of the target acquisition and tracking system described hereinabove, the present invention can operate with very low single-pixel SNRs and, therefore, very weak target returns. However, even higher sensitivity is obtained in a multiple-pulse "bootstrapping" mode. In this mode, a first acquisition pulse provides a weak target return which produces a noisy hologram. After transfer to the SLM 34 and readout, a beam is sent in the direction of the target, where it produces a low intensity because of the low hologram SNR. Even so, the hologram resulting from the target return due to this second acquisition pulse can have a higher SNR than the first one, increasing the energy-on-target for the next readout pulse.

With the present invention, as distinct from all-optical phase conjugation techniques, a hologram containing information about the target(s) and intervening media is available in electronic form. This hologram can be stored in computer memory and processed using high-speed electronic and/or optical processors to extract information about the target(s). As an example, by computing the Fourier transform of the hologram, the precise direction(s) of the target(s) is/are obtained. In the case of multiple targets, hologram "filtering" can be performed to remove targets, thereby allowing sequential engagement of targets.

Target feature tracking operates as follows. A first acquisition beam covers the entire object, or a part of the object of interest. The resulting SLM 34 output beam is concentrated on the strongest target feature within the illuminated area. The resulting target return writes a next hologram which further concentrates the energy on the target feature. For a laser pulse repetition rate compatible with the transverse target velocity, the laser beam tracks the target feature. Such target tracking is required for some system concepts such as IFF (Identification-Friend-or-Foe) schemes based on laser vibrometry.

Figure 4:
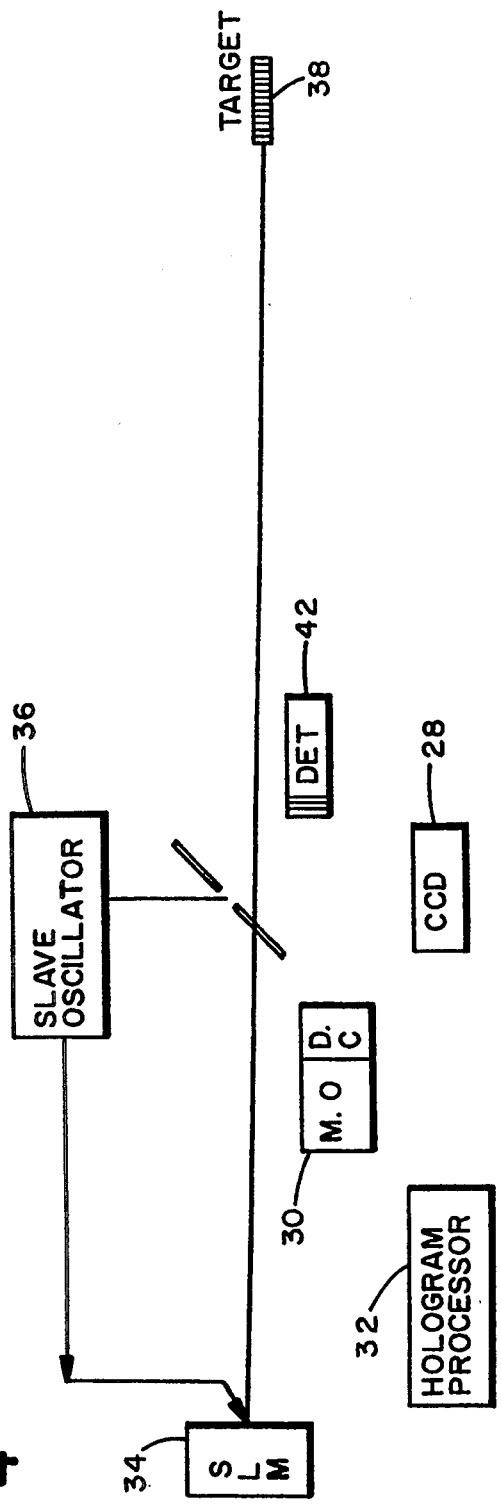
FIG. 4 is an illustration of the embodiment of FIG. 3 that shows an engagement step.
Figure 7:
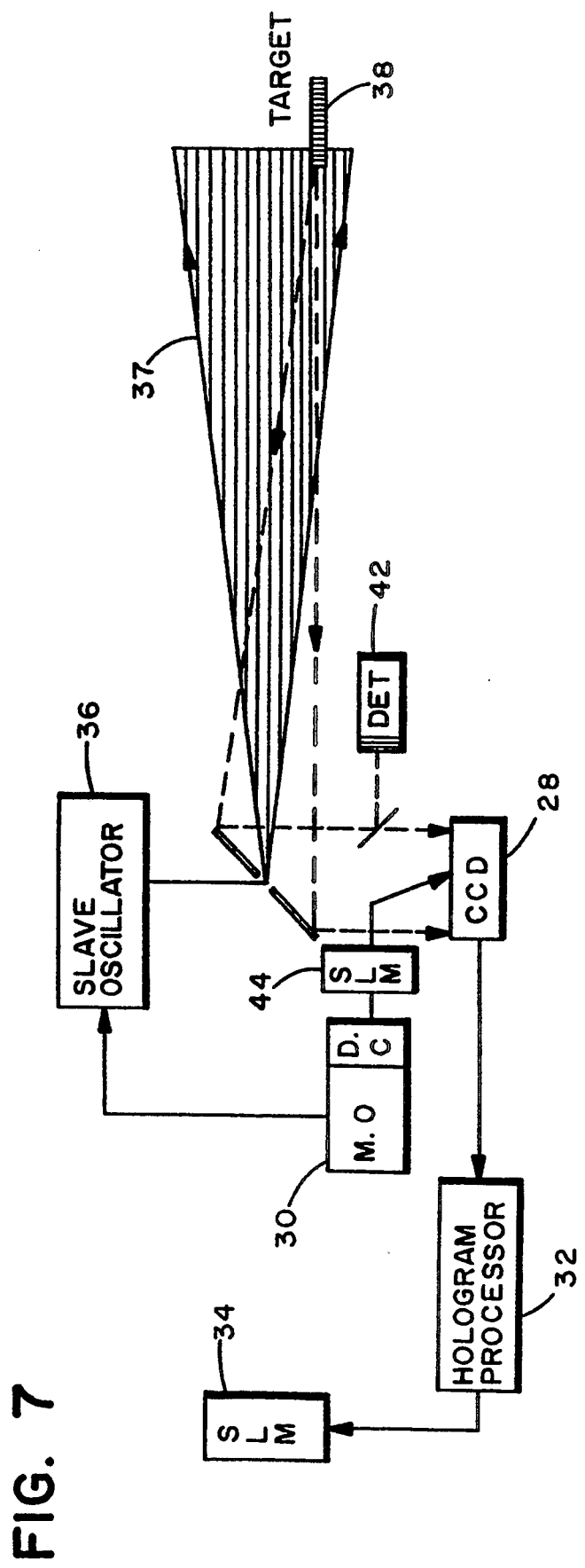
FIG. 7 is an illustration of an embodiment of a target acquisition and tracking system with additional beam control.

FIG. 7 shows a schematic illustration of a holographic interactive tracker (HIT) system with additional beam control capability such as precision pointing and focusing or defocusing. The difference over the system illustrated in FIGS. 3 and 4 is the addition of a second SLM 44 in the MO 30 beam path. Precision beamsteering away from the target direction is obtained by writing a linear phase profile on this second SLM 44. The resulting tilt of the MO beam results in a hologram which produces an output beam which is shifted from the phase-conjugate direction by the MO beam tilt introduced by SLM 44. Beam focusing and defocusing can be obtained in a similar way by writing a quadratic phase-profile on the second SLM 44. The beamsteering capability can be used e.g. for laser beam "point-ahead" in cases where the target moves appreciably during a time equal to the sum of the target roundtrip time and the system latency time. Beam defocusing can be used to spread the laser energy over an area larger than would be obtained with phase-conjugated operation.

The HIT system of the present invention also has applications in secure communications, including communications required for remote vehicle guidance. Different techniques apply to one- and two-way communications. In both cases, in a first step, a first platform initiating communications transmits a relatively large divergence beam in the direction of the second platform. If the location of the second platform is unknown to the required precision, scanning may be required. In the case of one-way communications, a corner cube on the second platform can act as a target to write a hologram on the first platform. When this hologram is read out, a low divergence beam is transmitted to the second platform.

In the case of two-way communications where both platforms carry a transceiver system, the second platform, warned by a detector (or laser warning receiver) that an attempt is being made to establish communications, has a hologram written on its CCD detector. If the direction of the incoming beam is not known to sufficient accuracy, a coarse mechanical scan must be performed until the beam from the first platform is within the second platform system field-of-view. The second platform reads out the hologram, resulting in a low divergence beam being transmitted to the first platform. This beam writes a hologram on the first platform which, after read-out, sends a low divergence beam to the second platform. The above sequence completes the establishment of a low-divergence link between the two platforms.

Steady-state communications can be obtained by reflecting modulated laser beams off the SLM(s). If phase-compensated atmospheric communication is needed, the SLM(s) must be updated at a rate compatible with the atmospheric dynamics; for typical wavelengths in the near-IR (e.g. at the eye-safe 1.54 $\mu$m wavelength) this update rate is on the order of 1 kHz. For moving platforms, the divergence(s) of the communication beam(s) and the SLM(s) update rate must be chosen to be compatible with the relative motion of the platforms. In some cases, the same pulsed laser can be used for both automatic tracking and for communications.

It should be understood that the foregoing description is only illustrative of the invention. Various alternatives and modifications can be devised by those skilled in the art without departing from the invention. As an example, the laser used in the engagement step (Step 2) of the invention, can be either a pulsed of CW laser. In applications where this laser is a CW laser, the SLM pattern must be updated through an acquisition step (Step 1) at a rate which is compatible with the dynamics of platform motion and/or atmospheric distortions. Accordingly, the present invention is intended to embrace all such alternatives, modifications and variances which fall within the scope of the appended claims.

What is claimed is:

1. A laser target acquisition and tracking system with compensation for aberrations comprising:
    laser means for directing a first wide divergence beam of radiation through media toward at least one target wherein said target reflects a portion of said radiation as a return beam,
    means for interfering said return beam with a reference beam on an electronic detector for generating an interference pattern in the form of electronic signals containing information about said target and said media,
    hologram processor means responsive to said electronic signals from said electronic radiation detector for processing said signals to form an electronic hologram pattern;
    a spatial light modulator responsive to said electronic hologram pattern from said hologram processor means for recording said processed hologram,
    and means for directing a beam of radiation onto said hologram recorded on said spatial light modulator for providing a conjugate beam representative of said return beam, said conjugate beam being directed to said target.

2. A laser target acquisition and tracking system according to claim 1 wherein said laser means includes a laser oscillator for producing a pulsed laser beam having a divergence greater than the typical target angular extent.

3. A laser target acquisition and tracking system according to claim 2 wherein said laser means includes a pulsed laser slave oscillator frequency-locked to a master oscillator.

4. A laser target acquisition and tracking system according to claim 1 wherein electronic detector means is a two-dimensional charge-coupled-device electronic detector for providing an electronic hologram in response to said interference pattern.

5. A laser target acquisition and tracking system according to claim 4 wherein said hologram processor means subtracts a d.c. bias term from said electronic hologram.

6. A laser target acquisition and tracking system according to claim 3 wherein said beam of radiation directed onto said spatial light modulator is a pulsed laser beam from said slave oscillator or a pulsed or CW laser beam from a separate laser.

7. A laser target acquisition and tracking system according to claim 4 wherein said hologram recorded on said spatial light modulator is a phase hologram.

8. A laser target acquisition and tracking system according to claim 5 wherein first wide divergence beam of radiation is directed toward a plurality of targets, and wherein said hologram processor filters said hologram to selectively remove targets from said hologram to allow sequential engagement of targets.

9. A laser target acquisition and tracking system according to claim 1 wherein said target means includes a laser means, an electronic detector means, a hologram processor means and a spatial light modulator means that functions in accordance with said first laser means, said first electronic detector means, said first hologram processor means and said first spatial light modulator to provide communication back from said target.

10. A laser-target acquisition and tracking system according to claim 1 further including a second spatial light modulator disposed between said reference beam and said second spatial light modulator having a linear or quadratic phase profile recorded thereon for tilting or (de-)focussing said reference beam to provide a hologram in said first spatial light modulator that produces an output beam that is shifted from or (de-)focussed compared to the phase-conjugate beam.

11. A method for pointing a laser beam at a target with a compensation for aberrations caused by the intervening media, comprising:
    illuminating target space with laser radiation,
    receiving at a receiver at least one radiation return reflection from a target in said space,
    interfering said return radiation with reference laser radiation to produce an interference pattern on a two dimensional detector array to produce a hologram containing information about the target and about the media and return path between the target and the hologram to thereby store a two dimensional array of electronic signals representing said hologram,
    transferring said array of signals from said two-dimensional detector array through a real time electronic hologram processor,
    thereafter imposing the said processed array of electronic signals on a spatial light modulator, and
    reading out the hologram on said spatial light modulator by interacting a second laser beam with said spatial light modulator hologram to direct a conjugate beam of focussed laser radiation automatically pointed to said target as a low divergence beam which compensates for the effects encountered in passing through said media.

12. A method for pointing a laser beam at a target according to claim 11 wherein said step of illuminating target space with laser radiation includes the step of directing a fast, wide divergence pulsed beam of radiation through said media.

13. A method for pointing a laser beam at a target according to claim 12 wherein said step of interfering said return radiation with reference laser radiation on a two dimensional detector array includes the step of interfering said laser radiation on a charge-coupled device electronic detector.

14. A method for pointing a laser beam at a target according to claim 12 wherein said step of transferring said array of signals through a real time electronic hologram processor includes the step of subtracting a d.c. bias term from said hologram.

15. A method for pointing to a laser beam at a target according to claim 12 wherein said illuminating step includes producing a pulsed laser beam from a laser oscillator, said pulsed laser beam having a divergence greater than the typical target angular extent.

16. A method for pointing a laser beam at a target according to claim 15 wherein said illuminating step includes producing a pulsed laser beam from a laser slave oscillator frequency-locked to a master oscillator.

17. A method for pointing a laser beam at a target according to claim 11 wherein said hologram recorded on said spatial light modulator is a phase hologram.

18. A method for pointing a laser beam at a target according to claim 11 wherein first wide divergence beam of radiation is directed toward a plurality of targets, and wherein said hologram processor filters said hologram to selectively remove targets from said hologram to allow sequential engagement of targets.

19. A method for pointing a laser beam at a target according to claim 11 wherein said target means includes a laser means, an electronic detector means, a hologram processor means and a spatial light modulator means that functions in accordance with said first laser means, said first electronic detector means, said first hologram processor means and said first spatial light modulator to provide communication back from said target.

20. A method for pointing a laser beam at a target according to claim 11 wherein a second spatial light modulator is disposed between said reference beam and said electronic detector means, said second spatial light modulator having a linear phase profile recorded thereon for tiling said reference beam to provide a hologram in said first spatial light modulator that produces an output beam that is shifted from the phase-conjugate direction by the beam tilt of said reference beam.

21. A method according to claim 1 which uses a sequence of acquisition and engagement steps in which, after a first acquisition step which initiates the sequence, each hologram is formed using the return from the previous engagement step in order to improve the detection signal-to-noise ratio and the energy delivered to the target (bootstrapping).

* * * * *